United States Patent
Nightingale et al.

(10) Patent No.: US 8,065,670 B2
(45) Date of Patent: Nov. 22, 2011

(54) METHOD AND APPARATUS FOR ENABLING OPTIMISTIC PROGRAM EXECUTION

(75) Inventors: Tycho G. Nightingale, Arlington, MA (US); Wayne Mesard, Belmont, MA (US)

(73) Assignee: Oracle America, Inc., Redwood Shores, CA (US)

( * ) Notice: Subject to any disclaimer, the term of this patent is extended or adjusted under 35 U.S.C. 154(b) by 1450 days.

(21) Appl. No.: 11/542,577

(22) Filed: Oct. 3, 2006

(65) Prior Publication Data

US 2008/0082804 A1    Apr. 3, 2008

(51) Int. Cl.
*G06F 9/45* (2006.01)

(52) U.S. Cl. ........ 717/151; 717/153; 717/154; 717/159; 717/160; 717/161

(58) Field of Classification Search .................. None
See application file for complete search history.

(56) References Cited

U.S. PATENT DOCUMENTS

| | | | |
|---|---|---|---|
| 6,327,699 B1 * | 12/2001 | Larus et al. ................... 717/128 |
| 7,549,146 B2 * | 6/2009 | Tian et al. ...................... 717/150 |
| 7,818,720 B2 * | 10/2010 | Gan et al. ....................... 717/130 |
| 2002/0035722 A1 * | 3/2002 | McKinsey et al. ................ 717/5 |
| 2002/0059568 A1 * | 5/2002 | Kawahito et al. ............. 717/151 |
| 2002/0112227 A1 * | 8/2002 | Kramskoy et al. ............. 717/148 |
| 2003/0014741 A1 * | 1/2003 | Megiddo et al. ............... 717/158 |

\* cited by examiner

*Primary Examiner* — Insun Kang
(74) *Attorney, Agent, or Firm* — Park, Vaughan, Fleming & Dowler LLP (57) ABSTRACT

A system that reduces overly optimistic program execution. During operation, the system encounters a bounded-execution block while executing a program, wherein the bounded execution block includes a primary path and a secondary path. Next, the system executes the bounded execution block. After executing the bounded execution block, the system determines whether executing instructions on the primary path is preferable to executing instructions on the secondary path based on information gathered while executing the bounded-execution block. If not, the system dynamically modifies the instructions of the bounded-execution block so that during subsequent passes through the bounded-execution block, the instructions on the secondary path are executed instead of the instructions on the primary path.

25 Claims, 6 Drawing Sheets

METHOD AND APPARATUS FOR ENABLING OPTIMISTIC PROGRAM EXECUTION

BACKGROUND

1. Field of the Invention

The present invention relates to techniques for improving performance within computer systems. More specifically, the present invention relates to a method and apparatus for enabling optimistic program execution.

2. Related Art

Several software and hardware mechanisms exist that can initiate a control transfer of execution to a pre-determined address in the event of an error or a failure during execution of a bounded-execution block. Examples of such mechanisms include try-catch blocks in languages including C++ and JAVA, the C library's setjmp-longjmp functions, and transactional-execution blocks in systems that support transactional memory. (JAVA is a registered trademark of Oracle Corporation).

These bounded-execution blocks contain a primary path, which is the preferable path or the optimal path, to be taken when executing the bounded-execution block. If the execution of the primary path fails, execution of the bounded-execution block restarts at the entrance of a secondary path. This secondary path can perform actions such as executing a copy of the instructions on the primary path using a different contention-handling mechanism (e.g., using locks instead of using transactional memory mechanisms), or performing a remedial action such as reporting an error.

The primary path is generally the optimistic path. If the execution of code on the primary path succeeds, then the overall execution time of the program will be reduced. However, conditions within the computer system can cause the primary path to constantly fail or to be less optimal than the secondary path. If the bounded-execution block is executed many times (e.g., within a for loop), it is inefficient and costly to repeatedly execute the code on the primary path when the code is likely to fail or is less optimal than the code in the secondary path.

Because of this risk, programmers and compilers use these techniques less aggressively than possible. In other words, they produce less-than-optimal code in the common case in order to avoid significant performance problems in unusual situations. Hence, what is needed is a method and an apparatus for enabling optimistic program execution.

SUMMARY

One embodiment of the present invention provides a system that reduces overly optimistic program execution. During operation, the system encounters a bounded-execution block while executing a program, wherein the bounded-execution block includes a primary path and a secondary path. Next, the system executes the bounded-execution block. After executing the bounded-execution block, the system determines whether executing instructions on the primary path is preferable to executing instructions on the secondary path based on information gathered while executing the bounded-execution block. If not, the system dynamically modifies the instructions of the bounded-execution block so that during subsequent passes through the bounded-execution block, the instructions on the secondary path are executed instead of the instructions on the primary path.

In a variation on this embodiment, while determining whether executing instructions on the primary path is preferable to executing instructions on the secondary path, the system determines whether execution of the primary path has failed a specified number of times.

In a further variation, during a given pass through the bounded-execution block, if execution on the primary path fails, the system increments a counter which keeps track of the number of times that execution of the instructions on the primary path has failed.

In a variation on this embodiment, while determining whether executing instructions on the primary path is preferable to executing instructions on the secondary path, the system queries hardware status registers to determine whether executing instructions on the secondary path is preferable to executing instructions on the primary path.

In a variation on this embodiment, while dynamically modifying the instructions for the bounded-execution block, the system dynamically modifies an in-memory version of the instructions for the bounded-execution block.

In a variation on this embodiment, while dynamically modifying the instructions for the bounded-execution block, the system dynamically modifies an on-disk version of the instructions for the bounded-execution block.

In a variation on this embodiment, the program is executed in a system that supports transactional memory.

In a further variation, the bounded-execution block is a transactional-execution block, and while dynamically modifying the instructions for the bounded-execution block, the system replaces a start-transactional-execution instruction with a lock-acquire instruction.

In a variation on this embodiment, while dynamically modifying the instructions of the bounded-execution block, the system rewrites instructions at the entry of the bounded-execution block to jump to an address for a first instruction on the secondary path.

In a variation on this embodiment, while dynamically modifying the instructions for the bounded-execution block, the system rewrites instructions at the entry of the bounded-execution block with the instructions for the secondary path.

In a variation on this embodiment, if at a later time, executing instructions on the primary path of the bounded-execution block is determined to be preferable to executing instructions on the secondary path, the system rewrites the modified instructions so that the primary path is executed again.

In a variation on this embodiment, the bounded-execution block is one of: a try catch block; a setjmp-longjmp sequence; a transactional-execution block; or any bounded-execution block that transfers execution to a pre-determined address when an error occurs during execution of the primary path of the bounded-execution block.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

OVERVIEW

One embodiment of the present invention determines whether executing a primary path within a bounded-execution block is preferable to executing a secondary path within the bounded-execution block. In one embodiment of the present invention, the bounded-execution block can: be a try-catch block, a setjmp-longjmp sequence, a transactional-execution block, or any bounded-execution block that transfers execution to a pre-determined address when an error occurs during execution of the primary path of the bounded-execution block.

Another embodiment of the present invention determines whether the primary path of the bounded-execution block is likely to always fail, or alternatively is likely to continue to fail during a transient set of conditions within the computer system.

In one embodiment of the present invention, if the primary path of the bounded-execution block is determined to be less optimal or likely to fail, the computer system dynamically modifies the instructions located at the entry of the bounded-execution block to transfer control directly to a pre-determined address. Typically the pre-determined address is the first instruction on the secondary path for the bounded-execution block.

In one embodiment of the present invention, if the failure to execute the instructions on the primary path is caused by a transient condition, once the transient condition passes, the system can decide to return to optimal efficiency by reversing the modification to the code.

By dynamically selecting between the primary path and the secondary path of a bounded-execution block, it is possible to obtain efficiency in the following cases:
  (1) where the execution of the primary path of the bounded-execution block succeeds;
  (2) where the execution of the primary path of the bounded-execution block always fails; and
  (3) where the execution of the primary path of the bounded-execution block fails during a transient period.

Enabling Optimistic Program Execution

Figure 1:
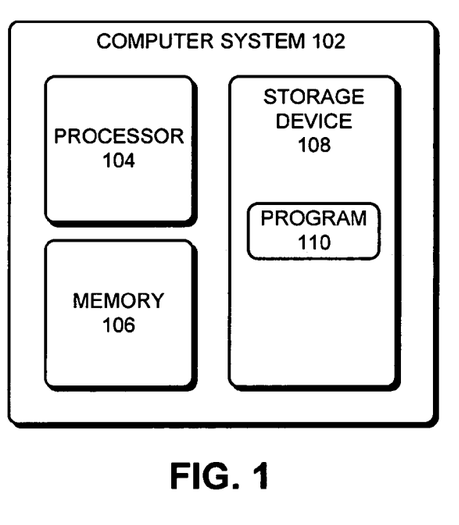
FIG. 1 illustrates a computer system in accordance with an embodiment of the present invention.

FIG. 1 illustrates computer system 102 in accordance with an embodiment of the present invention. Computer system 102 includes processor 104, memory 106, and storage device 108. Storage device 108 contains data and programs, including program 110. In one embodiment of the present invention, program 110 contains one or more bounded-execution blocks.

In one embodiment of the present invention, computer system 102 supports transactional memory. Note that FIGS. 3-10 describe a computer system that supports transactional memory.

Figure 2:
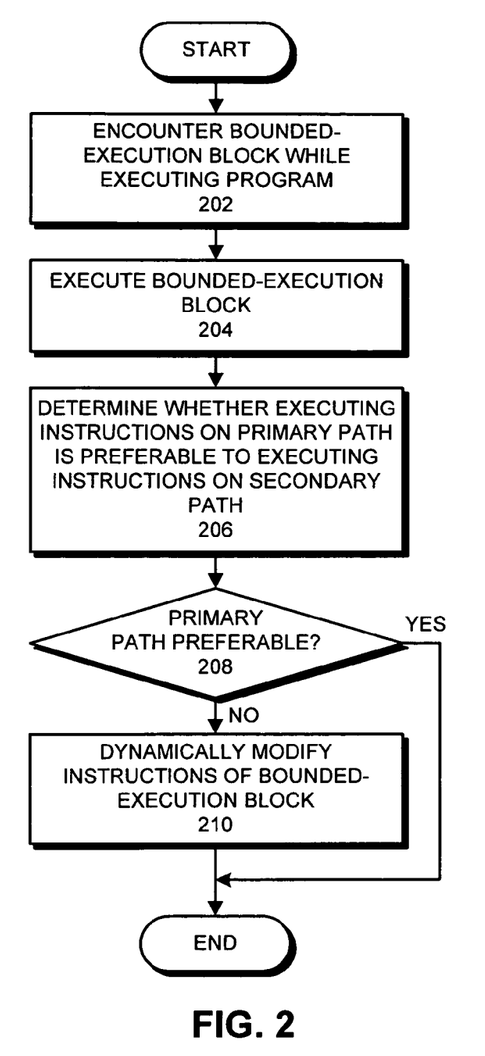
FIG. 2 presents a flow chart illustrating the process of enabling optimistic program execution in accordance with an embodiment of the present invention.

FIG. 2 presents a flow chart illustrating the process of enabling optimistic program execution in accordance with an embodiment of the present invention. The process begins when the system encounters a bounded-execution block while executing a program (step 202). In one embodiment of the present invention, the bounded-execution block includes a primary path and a secondary path. Next, the system executes the bounded-execution block (step 204).

After executing the bounded-execution block, the system determines whether executing instructions on the primary path is preferable to executing instructions on the secondary path based on information gathered while executing the bounded-execution block (step 206). In one embodiment of the present invention, while determining whether executing instructions on the primary path is preferable to executing instructions on the secondary path, the system determines whether execution of the primary path has failed a specified number of times. In another embodiment, during a given pass through the bounded-execution block, if execution on the primary path fails, the system increments a counter which keeps track of the number of times that execution of the instructions on the primary path has failed. In other embodiments, while determining whether executing instructions on the primary path is preferable to executing instructions on the secondary path, the system uses execution environment characteristics or queries hardware status registers to determine whether the secondary path is the preferable path.

If the primary path is not preferable to the secondary path (step 208—no), the system dynamically modifies the instructions of the bounded-execution block so that during subsequent passes through the bounded-execution block, the instructions on the secondary path are executed instead of the instructions on the primary path (step 210).

In one embodiment of the present invention, while dynamically modifying the instructions for the bounded-execution block, the system dynamically modifies an in-memory version of the instructions for the bounded-execution block. In another embodiment of the present invention, while dynamically modifying the instructions for the bounded-execution block, the system dynamically modifies an on-disk version of the instructions for the bounded-execution block.

In one embodiment of the present invention, the program is executed in a system that supports transactional memory. In this embodiment, the bounded-execution block is a transactional-execution block, and while dynamically modifying the instructions for the bounded-execution block, the system replaces a start-transactional-execution instruction with a lock-acquire instruction.

In one embodiment of the present invention, while dynamically modifying the instructions of the bounded-execution block, the system rewrites instructions at the entry of the bounded-execution block to jump to an address for a first instruction on the secondary path. In another embodiment, while dynamically modifying the instructions for the bounded-execution block, the system rewrites instructions at the entry of the bounded-execution block with the instructions for the secondary path.

In one embodiment of the present invention, if at a later time, executing instructions on the primary path of the bounded-execution block is determined to be preferable to executing instructions on the secondary path, the system rewrites the modified instructions so that the primary path is executed again.

Transactional-Memory Computer System

Figure 3:
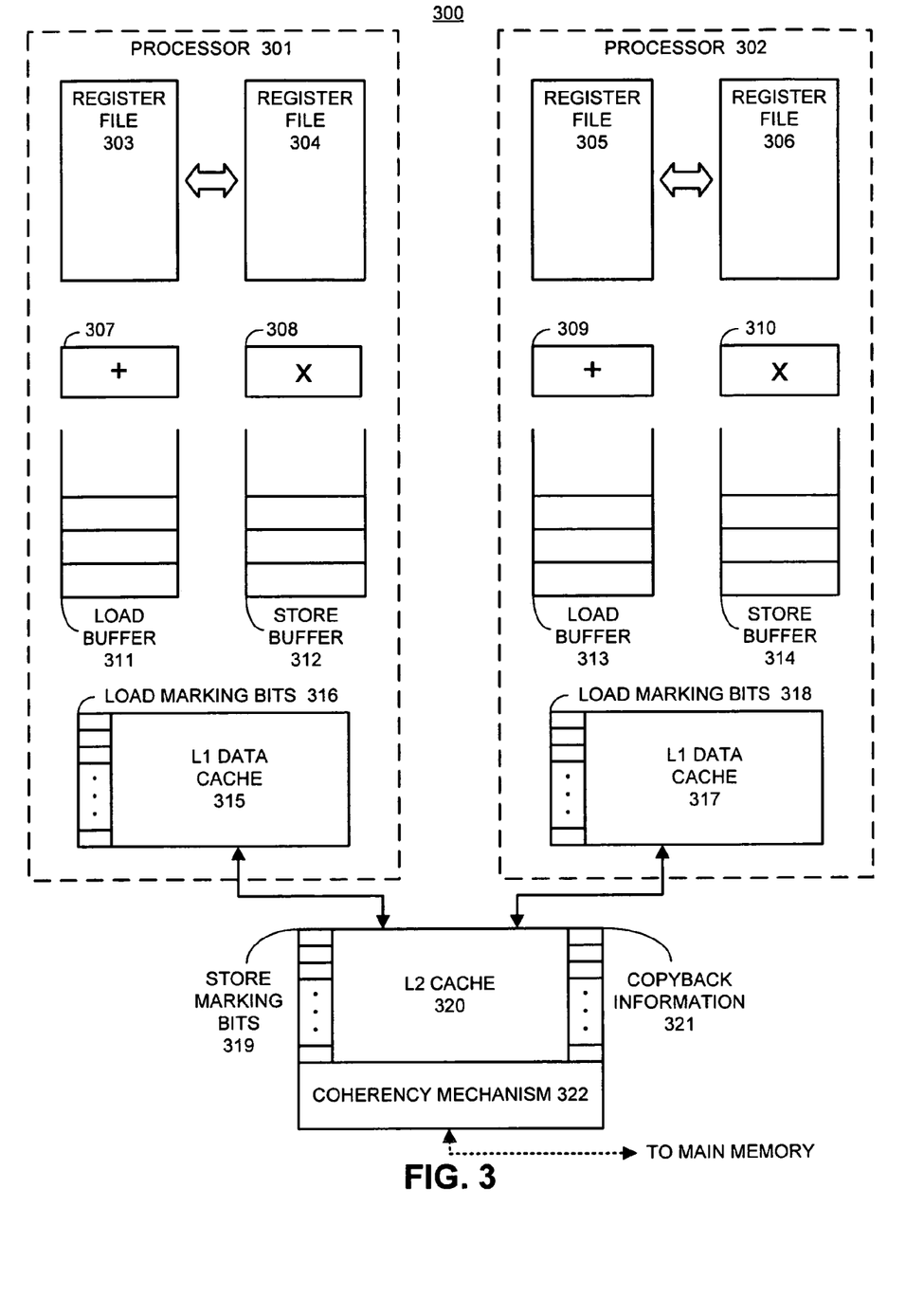
FIG. 3 illustrates a computer system that supports transactional memory in accordance with an embodiment of the present invention.

FIG. 3 illustrates a computer system 300 that supports transactional memory in accordance with an embodiment of the present invention. Computer system 300 can generally include any type of computer system, including, but not limited to, a computer system based on a microprocessor, a mainframe computer, a digital signal processor, a portable computing device, a personal organizer, a device controller, and a computational engine within an appliance. As is illustrated in FIG. 3, computer system 300 includes processors 301 and level 2 (L2) cache 320, which is coupled to main memory (not shown). Processor 302 is similar in structure to processor 301, so only processor 301 is described below.

Processor 301 has two register files 303 and 304, one of which is an "active register file" and the other of which is a backup "shadow register file." In one embodiment of the present invention, processor 301 provides a flash copy operation that instantly copies all of the values from register file 303 into register file 304. This facilitates a rapid register checkpointing operation to support speculative execution.

Processor 301 also includes one or more functional units, such as adder 307 and multiplier 308. These functional units are used in performing computational operations involving operands retrieved from register files 303 or 304. As in a conventional processor, load and store operations pass through load buffer 311 and store buffer 312.

Processor 301 additionally includes a level one (L1) data cache 315, which stores data items that are likely to be used by processor 301. Note that each line in L1 data cache 315 includes a "load marking bit," which indicates that a data value from the line has been loaded during speculative execution. This load marking bit is used to determine whether any interfering memory references take place during speculative execution as is described below with reference to FIGS. 5-10. Processor 301 also includes an L1 instruction cache (not shown).

Note that load marking does not necessarily have to take place in L1 data cache 315. In general load marking can take place at any level cache, such as L2 cache 320. However, for performance reasons, the load marking takes place at the cache level that is closest the processor as possible, which in this case is L1 data cache 315. Otherwise, loads would have to go to L2 cache 320 even on an L1 hit.

L2 cache 320 operates in concert with L1 data cache 315 (and a corresponding L1 instruction cache) in processor 301, and with L1 data cache 317 (and a corresponding L1 instruction cache) in processor 302. Note that L2 cache 320 is associated with a coherency mechanism 322, such as the reverse directory structure described in U.S. patent application Ser. No. 10/186,118, entitled, "Method and Apparatus for Facilitating Speculative Loads in a Multiprocessor System," filed on Jun. 26, 2002, by inventors Shailender Chaudhry and Marc Tremblay (Publication No. US-2002-0199066-A1). This coherency mechanism 322 maintains "copyback information" 321 for each cache line. This copyback information 321 facilitates sending a cache line from L2 cache 320 to a requesting processor in cases where the current version of the cache line must first be retrieved from another processor.

Each line in L2 cache 320 includes a "store marking bit," which indicates that a data value has been stored to the line during speculative execution. This store marking bit is used to determine whether any interfering memory references take place during speculative execution as is described below with reference to FIGS. 5-10. Note that store marking does not necessarily have to take place in L2 cache 320.

Ideally, the store marking takes place in the cache level closest to the processor where cache lines are coherent. For write-through L1 data caches, writes are automatically propagated to L2 cache 320. However, if an L1 data cache is a write-back cache, we perform store marking in the L1 data cache. (Note that the cache coherence protocol ensures that any other processor that subsequently modifies the same cache line will retrieve the cache line from the L1 cache, and will hence become aware of the store mark.)

Executing a Critical Section

Figure 4:
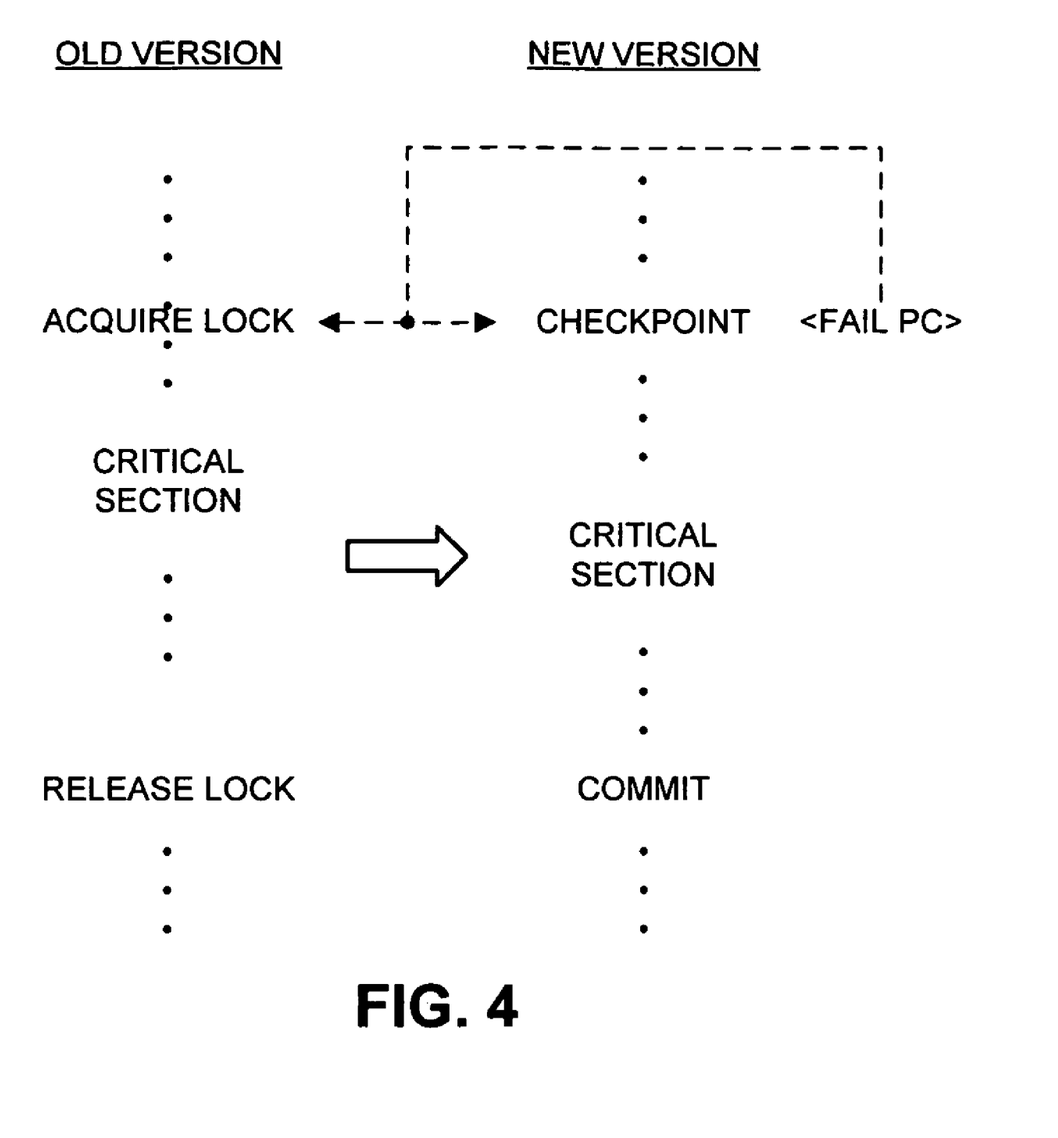
FIG. 4 illustrates how a critical section is executed in accordance with an embodiment of the present invention.

FIG. 4 illustrates how a critical section is executed in accordance with an embodiment of the present invention. As is illustrated in the left-hand side of FIG. 4, a process that executes a critical section typically acquires a lock associated with the critical section before entering the critical section. If the lock has been acquired by another process, the process may have to wait until the other process releases the lock. Upon leaving the critical section, the process releases the lock. (Note that the terms "thread" and "process" are used interchangeably throughout this specification.)

A lock can be associated with a shared data structure. For example, before accessing a shared data structure, a process can acquire a lock on the shared data structure. The process can then execute a critical section of code that accesses the shared data structure. After the process is finished accessing the shared data structure, the process releases the lock.

In contrast, in the present invention, the process does not acquire a lock, but instead executes a checkpoint instruction before entering the critical section. If the critical section is successfully completed without interference from other processes, the process performs a commit operation, to commit changes made during the speculative execution. This sequence of events is described in more detail below with reference to FIGS. 5-10.

Note that in one embodiment of the present invention a compiler replaces lock acquiring instructions with checkpoint instructions, and also replaces a corresponding lock releasing instructions with commit instructions. (Note that there may not be a one-to-one correspondence between replaced instructions. For example, a single lock acquisition operation comprised of multiple instructions may be replaced by a single checkpoint instruction.) The above discussion presumes that the processor's instruction set has been augmented to include a checkpoint instruction and a commit instruction. These instructions are described in more detail below with reference to FIGS. 6 and 9.

Speculative Execution Process

Figure 5:
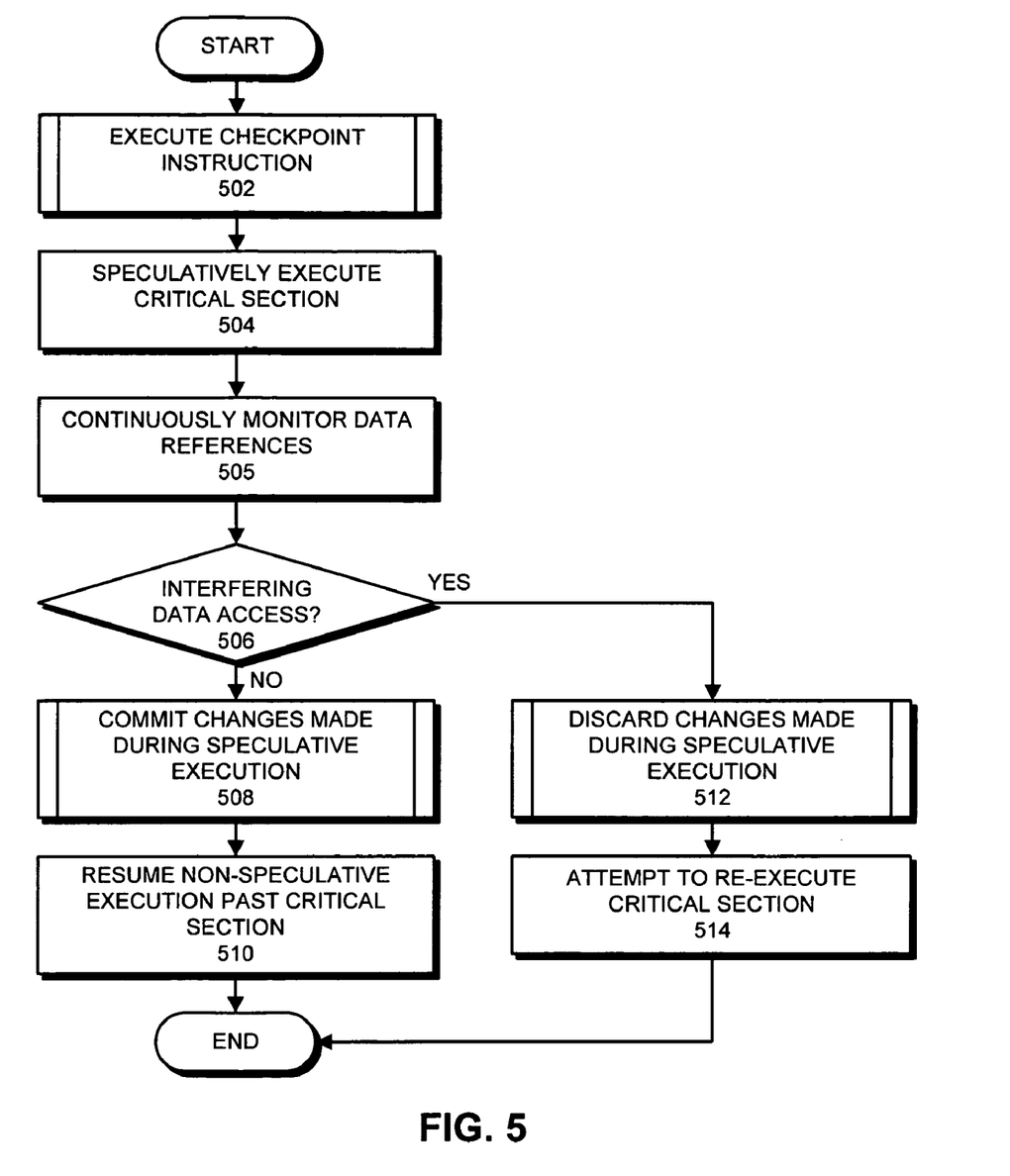
FIG. 5 presents a flow chart illustrating the speculative execution process in accordance with an embodiment of the present invention.

FIG. 5 presents a flow chart illustrating how speculative execution takes place in accordance with an embodiment of the present invention. A process first executes a checkpoint instruction prior to entering of a critical section of code (step 502). Next, the system speculatively executes code within the critical section, without committing results of the speculative execution (step 504).

During this speculative execution, the system continually monitors data references made by other processes (step 505), and determines if an interfering data access takes place during speculative execution (step 506). If not, the system commits changes made during speculative execution (step 508) and then resumes normal non-speculative execution of the program past the critical section (step 510).

On the other hand, if an interfering data access is detected, the system discards changes made during the speculative execution (step 512), and attempts to re-execute the critical section (step 514).

In one embodiment of the present invention, the system attempts the speculatively re-execute the critical section zero, one, two or more times. If these attempts are not successful, the system reverts back to the conventional technique of acquiring a lock on the critical section before entering the critical section, and then releasing the lock after leaving the critical section.

Note that an interfering data access can include a store by another process to a cache line that has been load marked by the process. It can also include a load or a store by another process to a cache line that has been store marked by the process.

Also note that circuitry to detect interfering data accesses can be easily implemented by making minor modifications to conventional cache coherence circuitry. This conventional cache coherence circuitry presently generates signals indicating whether a given cache line has been accessed by another processor. Hence, these signals can be used to determine whether an interfering data access has taken place.

Checkpointing Process

Figure 6:
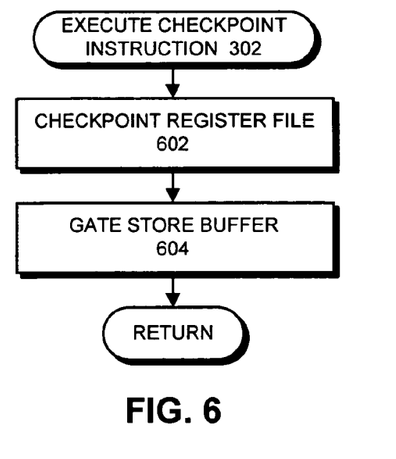
FIG. 6 presents a flow chart illustrating a checkpointing operation in accordance with an embodiment of the present invention.

FIG. 6 presents a flow chart illustrating a checkpoint operation in accordance with an embodiment of the present invention. This flow chart illustrates what takes place during step 502 of the flow chart in FIG. 5. The system starts by checkpointing the register file (step 602). This can involve performing a flash copy operation from register file 303 to register file 304 (see FIG. 3). In addition to checkpointing register values, this flash copy can also checkpoint various state registers associated with the currently executing process. In general, the flash copy operation checkpoints enough state to be able to restart the corresponding thread.

The checkpoint operation also causes store buffer 312 to become "gated" (step 604). This allows existing entries in store buffer to propagate to the memory sub-system, but prevents new store buffer entries generated during speculative execution from doing so.

Load Marking Process

Figure 7:
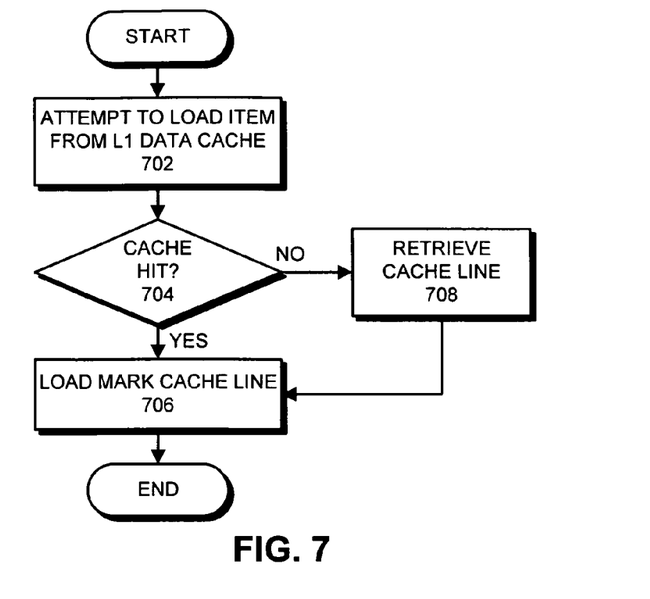
FIG. 7 presents a flow chart illustrating how load marking is performed during speculative execution in accordance with an embodiment of the present invention.

FIG. 7 presents a flow chart illustrating how load marking is performed during speculative execution in accordance with an embodiment of the present invention. During speculative execution of a critical section, the system performs a load operation. In performing this load operation, system first attempts to load a data item from L1 data cache 315 (step 702). If the load causes a cache hit, the system "load marks" the corresponding cache line in L1 data cache 315 (step 706). This involves setting the load marking bit for the cache line. Otherwise, if the load causes a cache miss, the system retrieves the cache line from lower levels of the memory hierarchy (step 708), and proceeds to step 706 to load mark the cache line in L1 data cache 315.

Store Marking Process

Figure 8:
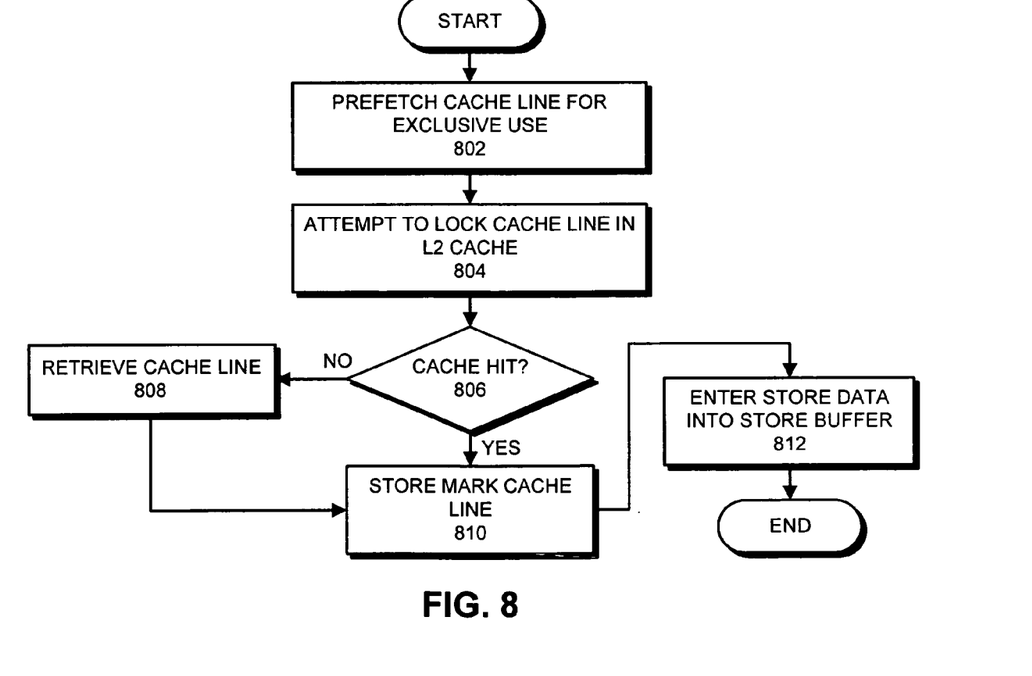
FIG. 8 presents a flow chart illustrating how store marking is performed during speculative execution in accordance with an embodiment of the present invention.

FIG. 8 presents a flow chart illustrating how store marking is performed during speculative execution in accordance with an embodiment of the present invention. During speculative execution of a critical section, the system performs a store operation. For this store operation, the system first prefetches a corresponding cache line for exclusive use (step 802). Note that this prefetch operation will do nothing if the line is already located in cache and is already in an exclusive use state.

Since in this example L1 data cache 315 is a write-through cache, the store operation propagates through L1 data cache 315 to L2 cache 320. The system then attempts to lock the cache line corresponding to the store operation in L2 data cache 315 (step 804). If the corresponding line is in L2 cache 320 (cache hit), the system "store marks" the corresponding cache line in L2 cache 320 (step 810). This involves setting the store marking bit for the cache line. Otherwise, if the corresponding line is not in L2 cache 320 (cache miss), the system retrieves the cache line from lower levels of the memory hierarchy (step 808) and then proceeds to step 810 to store mark the cache line in L2 cache 320.

Next, after the cache line is store marked in step 810, the system enters the store data into an entry of the store buffer 312 (step 812). Note that this store data will remain in store buffer 312 until a subsequent commit operation takes place, or until changes made during the speculative execution are discarded.

Commit Operation

Figure 9:
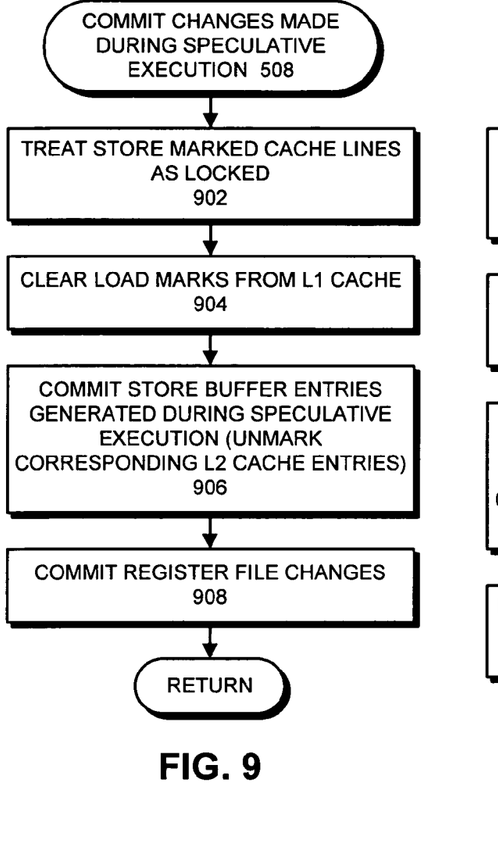
FIG. 9 presents a flow chart illustrating how a commit operation is performed after speculative execution completes successfully in accordance with an embodiment of the present invention.

FIG. 9 presents a flow chart illustrating how a commit operation is performed after speculative execution completes successfully in accordance with an embodiment of the present invention. This flow chart illustrates what takes place during step 508 of the flow chart in FIG. 5.

The system starts by treating store-marked cache lines as though they are locked (step 902). This means other processes that request a store-marked line must wait until the line is no longer locked before they can access the line. This is similar to how lines are locked in conventional caches.

Next, the system clears load marks from L1 data cache 315 (step 904).

The system then commits entries from store buffer 312, which were generated during the speculative execution, into the memory hierarchy (step 906). As each entry is committed, a corresponding line in L2 cache 320 is unmarked.

The system also commits register file changes (step 908). For example, this can involve performing a flash copy between register file 303 and register file 304 in the system illustrated in FIG. 3.

Discarding Changes

Figure 10:
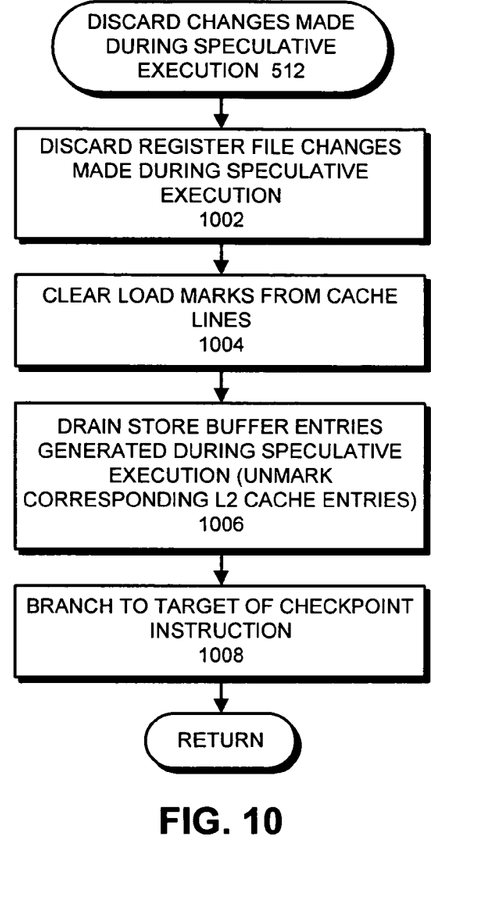
FIG. 10 presents a flow chart illustrating how changes are discarded after speculative execution completes unsuccessfully in accordance with an embodiment of the present invention.

FIG. 10 presents a flow chart illustrating how changes are discarded after speculative execution completes unsuccessfully in accordance with an embodiment of the present invention. This flow chart illustrates what takes place during step 512 of the flow chart in FIG. 5. The system first discards register file changes made during the speculative execution (step 1002). This can involve either clearing or simply ignoring register file changes made during speculative execution. This is easy to accomplish because the old register values were checkpointed prior to commencing speculative execution. The system also clears load marks from cache lines in L1 data cache 115 (step 1004), and drains store buffer entries generated during speculative execution without committing them to the memory hierarchy (step 1006). At the same time, the system unmarks corresponding L2 cache lines. Finally, in one embodiment of the present invention, the system branches to a target location specified by the checkpoint instruction (step 1008). The code at this target location attempts to re-execute the critical section as is described above with reference to step 514 of FIG. 5.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for enabling optimistic program execution, comprising:
    encountering a bounded-execution block while executing a program, wherein the bounded execution block includes a primary path and a secondary path;
    executing the bounded execution block;
    after executing the bounded execution block, determining whether executing instructions on the primary path is preferable to executing instructions on the secondary path based on information gathered while executing the bounded-execution block; and
    if not, dynamically modifying the instructions of the bounded-execution block so that during subsequent passes through the bounded-execution block, the instructions on the secondary path are executed instead of the instructions on the primary path.

2. The method of claim 1, wherein determining whether executing instructions on the primary path is preferable to executing instructions on the secondary path involves determining whether execution of the primary path has failed a specified number of times.

3. The method of claim 2, wherein during a given pass through the bounded-execution block, if execution on the primary path fails, the method further comprises incrementing a counter which keeps track of the number of times that execution of the instructions on the primary path has failed.

4. The method of claim 1, wherein determining whether executing instructions on the primary path is preferable to executing instructions on the secondary path involves querying hardware status registers to determine whether executing instructions on the secondary path is preferable to executing instructions on the primary path.

5. The method of claim 1, wherein dynamically modifying the instructions for the bounded-execution block involves dynamically modifying an in memory version of the instructions for the bounded-execution block.

6. The method of claim 1, wherein dynamically modifying the instructions for the bounded-execution block involves dynamically modifying an on disk version of the instructions for the bounded-execution block.

7. The method of claim 1, wherein the program is executed in a system that supports transactional memory.

8. The method of claim 7,
    wherein the bounded-execution block is a transactional execution block; and
    wherein dynamically modifying the instructions for the bounded-execution block involves replacing a start transactional execution instruction with a lock acquire instruction.

9. The method of claim 1, wherein dynamically modifying the instructions of the bounded-execution block involves rewriting instructions at the entry of the bounded-execution block to jump to an address for a first instruction on the secondary path.

10. The method of claim 1, wherein dynamically modifying the instructions for the bounded-execution block involves rewriting instructions at the entry of the bounded-execution block with the instructions for the secondary path.

11. The method of claim 1, wherein if at a later time, executing instructions on the primary path of the bounded-execution block is determined to be preferable to executing instructions on the secondary path, the method further comprises rewriting the modified instructions so that the primary path is executed again.

12. The method of claim 1, wherein the bounded execution block is one of:
    a try catch block;
    a setjmp-longjmp sequence;
    a transactional execution block; and
    any bounded execution block that transfers execution to a predetermined address when an error occurs during execution of the primary path of the bounded execution block.

13. A computer-readable storage medium storing instructions that when executed by a computer cause the computer to perform a method for enabling optimistic program execution, wherein the method comprises:
    encountering a bounded-execution block while executing a program, wherein the bounded execution block includes a primary path and a secondary path;
    executing the bounded execution block;
    after executing the bounded execution block, determining whether executing instructions on the primary path is preferable to executing instructions on the secondary path based on information gathered while executing the bounded-execution block; and
    if not, dynamically modifying the instructions of the bounded-execution block so that during subsequent passes through the bounded-execution block, the instructions on the secondary path are executed instead of the instructions on the primary path.

14. The computer-readable storage medium of claim 13, wherein determining whether executing instructions on the primary path is preferable to executing instructions on the secondary path involves determining whether execution of the primary path has failed a specified number of times.

15. The computer-readable storage medium of claim 14, wherein during a given pass through the bounded-execution block, if execution on the primary path fails, the method further comprises incrementing a counter which keeps track of the number of times that execution of the instructions on the primary path has failed.

16. The computer-readable storage medium of claim 13, wherein determining whether executing instructions on the primary path is preferable to executing instructions on the secondary path involves querying hardware status registers to determine whether executing instructions on the secondary path is preferable to executing instructions on the primary path.

17. The computer-readable storage medium of claim 13, wherein dynamically modifying the instructions for the bounded-execution block involves dynamically modifying an in memory version of the instructions for the bounded execution block.

18. The computer-readable storage medium of claim 13, wherein dynamically modifying the instructions for the bounded-execution block involves dynamically modifying an on disk version of the instructions for the bounded execution block.

19. The computer-readable storage medium of claim 13, wherein the program is executed in a system that supports transactional memory.

20. The computer-readable storage medium of claim 19,
   wherein the bounded-execution block is a transactional execution block; and
   wherein dynamically modifying the instructions for the bounded-execution block involves replacing a start transactional execution instruction with a lock acquire instruction.

21. The computer-readable storage medium of claim 13, wherein dynamically modifying the instructions of the bounded-execution block involves rewriting instructions at the entry of the bounded-execution block to jump to an address for a first instruction on the secondary path.

22. The computer-readable storage medium of claim 13, wherein dynamically modifying the instructions for the bounded-execution block involves rewriting instructions at the entry of the bounded-execution block with the instructions for the secondary path.

23. The computer-readable storage medium of claim 13, wherein if at a later time, executing instructions on the primary path of the bounded-execution block is determined to be preferable to executing instructions on the secondary path, the method further comprises rewriting the modified instructions so that the primary path is executed again.

24. The computer-readable storage medium of claim 13, wherein the bounded execution block is one of:
   a try catch block;
   a setjmp-longjmp sequence;
   a transactional execution block; and
   any bounded execution block that transfers execution to a predetermined address when an error occurs during execution of the primary path of the bounded execution block.

25. An apparatus that enables optimistic program execution, the apparatus comprising:
   a processor comprising a program execution mechanism configured to execute a program, wherein the program execution mechanism is further configured to execute a bounded execution block if the program execution mechanism encounters the bounded execution block while executing the program, wherein the bounded execution block includes a primary path and a secondary path, and
   wherein the program execution mechanism is further configured to, after executing the bounded execution block:
      determine whether executing instructions on the primary path is preferable to executing instructions on the secondary path based on information gathered while executing the bounded execution block; and
      if not, dynamically modify the instructions of the bounded-execution block so that during subsequent passes through the bounded execution block, the instructions on the secondary path are executed instead of the instructions on the primary path.

* * * * *